(12) United States Patent
Bergman et al.

(10) Patent No.: US 12,404,427 B2
(45) Date of Patent: Sep. 2, 2025

(54) ADHESIVE TAPES AND METHODS OF USE IN CONSTRUCTION

(71) Applicant: 3M INNOVATIVE PROPERTIES COMPANY, St. Paul, MN (US)

(72) Inventors: James A. Bergman, St. Paul, MN (US); Kevin M. Lewandowski, Inver Grove Heights, MN (US); Jeremy P. Gundale, Woodbury, MN (US); Thu-Van T. Tran, Maplewood, MN (US); Jenna L. Richardson, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 418 days.

(21) Appl. No.: 17/636,443

(22) PCT Filed: Aug. 14, 2020

(86) PCT No.: PCT/IB2020/057690
§ 371 (c)(1),
(2) Date: Feb. 18, 2022

(87) PCT Pub. No.: WO2021/033111
PCT Pub. Date: Feb. 25, 2021

(65) Prior Publication Data
US 2022/0298390 A1  Sep. 22, 2022

Related U.S. Application Data

(60) Provisional application No. 62/888,818, filed on Aug. 19, 2019.

(51) Int. Cl.
*C09J 7/29* (2018.01)
*B32B 27/08* (2006.01)
(Continued)

(52) U.S. Cl.
CPC ............... *C09J 7/385* (2018.01); *B32B 27/08* (2013.01); *B32B 27/20* (2013.01); *B32B 27/32* (2013.01);
(Continued)

(58) Field of Classification Search
None
See application file for complete search history.

(56) References Cited

U.S. PATENT DOCUMENTS 2,884,126 A  4/1959  Ulrich
4,835,217 A  5/1989  Jorgensen
(Continued)

FOREIGN PATENT DOCUMENTS

DE  102009047256  6/2011
EP  2573150  3/2013
(Continued)

OTHER PUBLICATIONS

3M Window and Door Flashing Tape 8067, 2018.*
(Continued)

*Primary Examiner* — Anish P Desai
(74) *Attorney, Agent, or Firm* — Kathleen B. Gross (57) ABSTRACT

An adhesive tape and methods of use in cold or hot environments, such as in the construction industry, wherein the adhesive tape includes a pressure sensitive adhesive layer (preferably, an acrylic pressure sensitive adhesive layer) disposed on a backing (preferably, a multilayer backing).

20 Claims, 1 Drawing Sheet

(51) Int. Cl.
*B32B 27/20* (2006.01)
*B32B 27/32* (2006.01)
*C09J 7/38* (2018.01)
*E04B 1/68* (2006.01)

(52) U.S. Cl.
CPC .............. *C09J 7/29* (2018.01); *E04B 1/6803* (2013.01); *B32B 2255/10* (2013.01); *B32B 2255/26* (2013.01); *B32B 2274/00* (2013.01); *B32B 2307/732* (2013.01); *B32B 2405/00* (2013.01); *C09J 2203/346* (2020.08); *Y10T 428/2848* (2015.01); *Y10T 428/2891* (2015.01)

(56) References Cited

U.S. PATENT DOCUMENTS

| | | | |
|---|---|---|---|
| 5,648,425 A * | 7/1997 | Everaerts | C09J 7/385 |
| | | | 525/329.2 |
| 6,511,743 B1 | 1/2003 | Ko | |
| 6,737,155 B1 | 5/2004 | Ou | |
| 7,677,002 B2 | 3/2010 | Bennett | |
| 7,790,258 B2 | 9/2010 | Blum | |
| 8,137,807 B2 * | 3/2012 | Clapper | C09J 133/04 |
| | | | 524/270 |
| 9,102,774 B2 * | 8/2015 | Clapper | C08F 220/10 |
| 9,969,908 B2 | 5/2018 | Keite-Telgenbuscher | |
| 9,997,657 B2 | 6/2018 | Weigel | |
| 10,038,111 B2 | 7/2018 | Weigel | |
| 10,704,254 B2 | 7/2020 | Seabaugh | |
| 11,105,089 B2 | 8/2021 | Widenbrant | |
| 11,512,463 B2 | 11/2022 | Widenbrant | |
| 2003/0207062 A1 | 11/2003 | Herzog | |
| 2010/0307658 A1 | 12/2010 | Galush | |
| 2013/0052461 A1 | 2/2013 | Muta | |
| 2014/0178683 A1 | 6/2014 | Kabutoya | |
| 2014/0377553 A1 * | 12/2014 | Clapper | C09J 133/08 |
| | | | 526/318.42 |
| 2016/0304753 A1 | 10/2016 | Clapper | |
| 2017/0173916 A1 | 6/2017 | Widenbrant | |
| 2018/0001595 A1 | 1/2018 | Seabaugh | |
| 2018/0118981 A1 | 5/2018 | Durand | |
| 2019/0031923 A1 * | 1/2019 | Khurana | C09J 7/29 |
| 2020/0102482 A1 | 4/2020 | Widenbrant | |
| 2021/0207005 A1 | 7/2021 | Seabaugh | |

FOREIGN PATENT DOCUMENTS

| | | | |
|---|---|---|---|
| JP | 04368533 | 12/1992 | |
| JP | 08082065 | 3/1996 | |
| JP | 10017831 | 1/1998 | |
| JP | 10058579 | 3/1998 | |
| JP | 11199837 | 7/1999 | |
| JP | 11291434 | 10/1999 | |
| JP | 2004002577 | 1/2004 | |
| JP | 2004003225 | 1/2004 | |
| JP | 2006143867 | 6/2006 | |
| JP | 2017088655 | 5/2017 | |
| WO | WO2007-068596 | 6/2007 | |
| WO | WO-2016137793 A1 * | 9/2016 | C09J 133/00 |
| WO | WO2017-037438 | 3/2017 | |

OTHER PUBLICATIONS

Zip System Tape, 2015.*
Supplementary European Search Report, EP Application No. 20855375, Jul. 24, 2023, 4 pages.
3M™ Window and Door Flashing Tape 8067, 2018, 5 pages.
Protecto Super Stick Building Tape, Technical Data Sheet, 06/14, 2 pages.
Wakabayashi, "Studies on s-Triazines. I. Cotrimerization of Trichloroacetonitrile with Other Nitriles", Bulletin of the Chemical Society of Japan, 1969, vol. 42, No. 10, pp. 2924-2930.
Zip System Tape, 2015, 2 pages.
International Search Report for PCT International Application No. PCT/IB2020/057690, mailed on Nov. 4, 2020, 3 pages.

* cited by examiner

ADHESIVE TAPES AND METHODS OF USE IN CONSTRUCTION

BACKGROUND

Many types of tape products are commercially available for the construction industry. Pressure sensitive adhesive (PSA) tapes are highly desirable in this industry if they provide good performance at extreme temperatures, particularly at both low and high temperatures. Currently, no acrylic PSA construction tapes provide good performance at both low and high temperatures. Certain products can achieve high temperature shear and adhesion performance but have too high of a modulus and glass transition temperature ($T_g$) to achieve low temperature performance.

Conventional seam sealing tapes provide low temperature performance by limiting the cohesive strength (low acid; low crosslinking), but this reduces high temperature peel and shear performance. Other additives, such as plasticizers, can be used to provide cold temperature performance; however, these mobile species can diminish long-term stability and disrupt high temperature performance. It is highly desirable to improve low temperature performance of these products, so they can be applied in lower temperature climates without loss of performance at higher temperatures. Thus, it is desirable to provide an adhesive tape that has good performance at both high and low temperatures.

SUMMARY

The present disclosure provides an adhesive tape and methods of use in cold or hot environments, such as in the construction industry.

The adhesive tapes described herein include a pressure sensitive adhesive layer (preferably, an acrylic pressure sensitive adhesive layer) disposed on a backing (preferably, a multilayer backing). Such tapes may be used in the construction industry as seam sealing tapes, roofing tapes, and flashing tapes such as may be used around windows, doors, and other wall penetrations. A preferred adhesive tape is a seam sealing tape.

In one embodiment of an adhesive tape, the acrylic pressure sensitive adhesive includes a polymer including interpolymerized monomers. These monomers include: 80 to 99.9 parts by weight of one or more (meth)acrylic acid ester monomers of Formula (I):

$$RO\!-\!C(O)\!-\!C(R^3)\!=\!CH_2$$

wherein: R is a branched alkyl having 10 to 18 carbon atoms; and $R^3$ is H or $CH_3$; 0.1 to 20 parts by weight of one or more acid-functional, ethylenically unsaturated monomers; and 0 to 10 parts by weight of one or more non-acid functional, ethylenically unsaturated polar monomers.

In one embodiment of an adhesive tape, the backing includes: a core layer, having a first major surface opposite a second major surface, and having a core layer thickness of 10.0 to 4,500 micrometers (i.e., microns); and a skin layer having a different composition from the core layer, having a skin layer thickness of 3.0 to 1,500 microns but not more than 50% of the core layer thickness, bonded directly to the first major surface of the core layer.

In certain embodiments, the backing has a coefficient of thermal expansion of less than 90 ppm/° C. as measured in at least one direction within the plane of the backing.

In one embodiment, the acrylic pressure sensitive adhesive layer is disposed on (directly or indirectly) the second major surface of the core layer. In one embodiment, the skin layer is a first skin layer and the backing includes a second skin layer. The second skin layer is typically positioned between the acrylic pressure sensitive adhesive layer and the core layer of the backing. In such an embodiment, the adhesive layer is disposed indirectly on the core layer.

In certain embodiments, methods are provided that include applying an adhesive tape to an exterior surface of a building by positioning the adhesive layer of the tape to the exterior surface of at least one wood-based panel on the exterior of a building, and applying manual pressure to the backing of the tape.

In some embodiments, the adhesive tape is a seam sealing tape and the method includes applying the seam sealing tape to an exterior surface of a building by positioning the adhesive layer of the seam sealing tape to the exterior surface of a butt-joint formed by two wood-based panels on the exterior of a building, and applying manual pressure to the backing of the tape.

In one embodiment, a method of applying an adhesive tape, which includes a pressure sensitive adhesive layer disposed on a bacing, to an exterior surface of a building in a cold environment is provided.

In one embodiment, the method includes: positioning the adhesive layer of the adhesive tape to the exterior surface of at least one wood-based panel on the exterior of a building; wherein the exterior surface of the building is in a cold environment and the at least one wood-based panel has an average surface temperature of less than −18° C. (0° F.); and applying manual pressure to the backing of the tape; wherein the adhesive tape passes the Low Temperature Peel Adhesion Test at −10° F. (−23° C.).

In one embodiment, the method includes: positioning the adhesive layer of a seam sealing tape to the exterior surface of a butt-joint formed by two wood-based panels on the exterior of a building, wherein the exterior surface of the two wood-based panels have an average surface temperature of less than −18° C. (0° F.); and applying manual pressure to the backing of the tape.

In another embodiment, a method of applying an adhesive tape, which includes a pressure sensitive adhesive layer disposed on a backing, to an exterior surface of a building in a hot environment is provided.

In one embodiment, the method includes: positioning the adhesive layer of the adhesive tape to the exterior surface of at least one wood-based panel on the exterior of a building; wherein the exterior surface of the building is in a hot environment and the at least one wood-based panel has an average surface temperature of at least 50° C. (122° F.); and applying manual pressure to the backing of the tape; wherein the adhesive tape passes the High Temperature Shear Test.

In one embodiment, the method includes: positioning the adhesive layer of the seam sealing tape to the exterior surface of a butt-joint formed by two wood-based panels on the exterior of a building, wherein the exterior surface of the two wood-based panels have an average surface temperature of at least 50° C. (122° F.); applying manual pressure to the backing of the tape.

Herein, a "wood-based panel" is a sheet material (e.g., a structural sheathing panel) that contains a significant amount of wood, e.g., in the form of strips, veneers, chips, strands, or fibers. As used herein, "wood" is rigid cellular structure containing cellulose, such as cellular material having cell walls composed of cellulose and hemicellulose fibers bonded together by lignin polymer.

Herein, a pressure sensitive adhesive (PSA) is used in its conventional manner according to the Pressure-Sensitive Tape Council, which states that PSAs are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Central to all PSAs is a desired balance of adhesion and cohesion that is often achieved by optimizing the physical properties of the elastomer, such as glass transition temperature and modulus. For example, if the glass transition temperature ($T_g$) or modulus of the elastomer is too high and above the Dahlquist criterion for tack (storage modulus of $3 \times 10^6$ dynes/cm$^2$ at room temperature and oscillation frequency of 1 Hz), the material will not be tacky and is not useful by itself as a PSA material.

Herein, a $T_g$ (i.e., glass transition temperature) of the polymer may be measured by Dynamic Mechanical Analysis (DMA) as the maximum in tan δ. The $T_g$ values of monomers are typically literature values for the corresponding homopolymers.

Herein, the "(meth)acrylate" or "(meth)acrylic" is inclusive of both acrylate/acrylic and methacrylate/methacrylic.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also, herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also, herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one R group is present in a formula, each R group is independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples. These examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

The present disclosure provides an adhesive tape and methods of use in cold or hot environments, such as in the construction industry.

The tapes described herein include a pressure sensitive adhesive layer (preferably, an acrylic pressure sensitive adhesive layer) disposed on a backing (preferably, a multilayer backing). Such tapes may be used in the construction industry as seam sealing tapes, roofing tapes, and flashing tapes such as may be used around windows, doors, and other penetrations. A preferred tape is a seam sealing; tape.

In some embodiments, the backing is a multilayer backing. A multilayer backing includes at least 2 layers. Exemplary adhesive tapes with multilayer backings are shown in FIG. 1 (with a two-layer backing) and FIG. 2 (with a three-layer backing).

Figure 1:
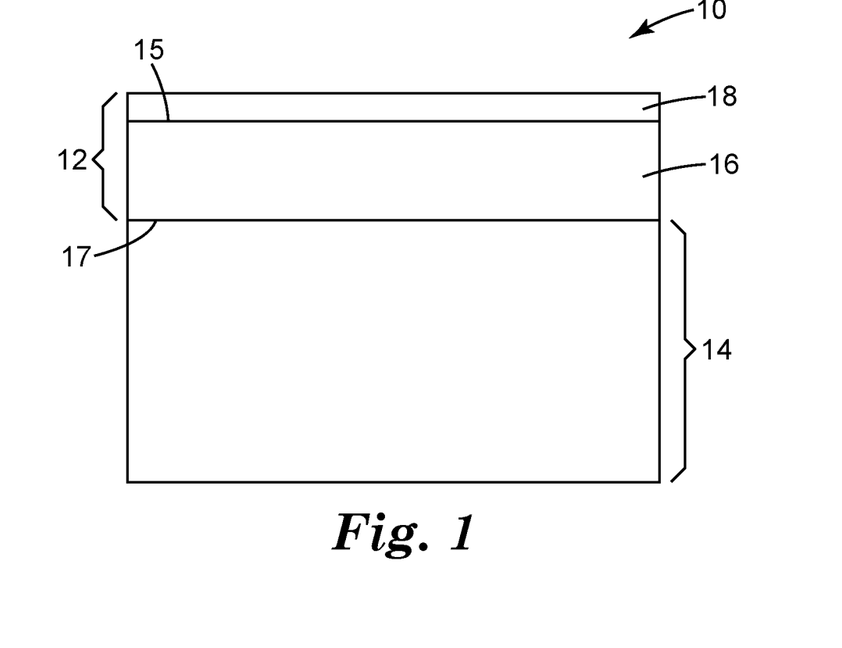
FIG. 1 is a cross-sectional representation of an adhesive tape with a two-layer backing and a pressure sensitive adhesive layer disposed thereon.

In FIG. 1, an adhesive tape 10 is shown with a backing 12 and a pressure sensitive adhesive layer 14 disposed thereon. The backing 12 includes a core layer 16 and a skin layer 18. The core layer 16 has a first major surface 15 and a second major surface 17. The skin layer 18 is disposed on (e.g., directly bonded to) the first surface 15 of the core layer 16. The adhesive layer 14 is disposed on (e.g., directly bonded to) the second major surface 17 of the core layer 16.

Figure 2:
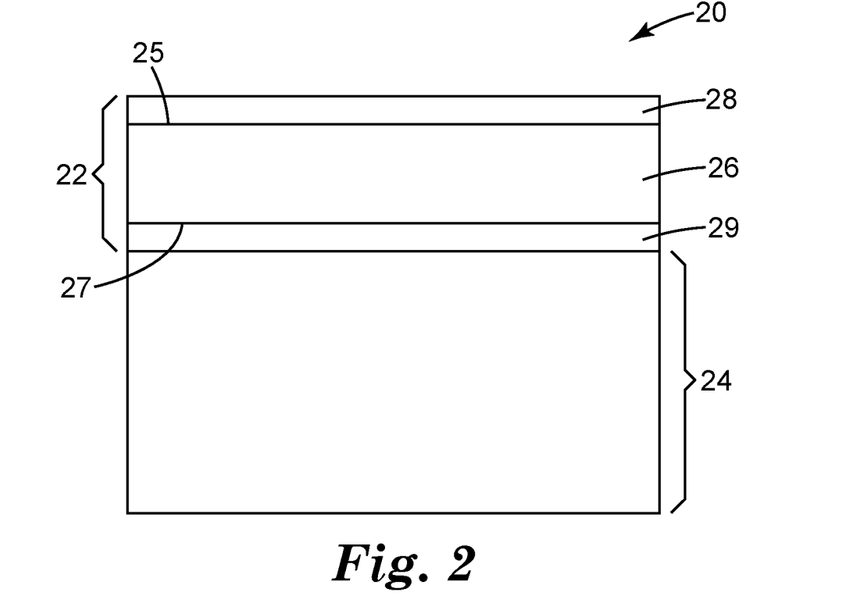
FIG. 2 is a cross-sectional representation of an adhesive tape with a three-layer backing and a pressure sensitive adhesive layer disposed thereon.

In FIG. 2, an adhesive tape 20 is shown with a backing 22 and a pressure sensitive adhesive layer 24 disposed thereon. The backing 22 includes a core layer 26, a first skin layer 28 and a second skin layer 29. The core layer 26 has a first major surface 25 and a second major surface 27. The first skin layer 28 is disposed on (e.g., directly bonded to) the first major surface 25 of the core layer 26. The second skin layer 29 is disposed on (e.g., directly bonded to) the second major surface 27 of the core layer 26. The adhesive layer 24 is disposed on (e.g., directly bonded to) the second skin layer 29 of the backing 22. That is, the adhesive layer 24 is bonded directly to the second skin layer 29 on a surface opposite the core layer 26.

The methods include applying an adhesive tape to an exterior surface of a building. In some embodiments, the methods include applying an adhesive tape to an exterior surface of a building by positioning the adhesive layer of the tape to the exterior surface of at least one wood-based panel on the exterior of a building, and applying manual pressure to the backing of the tape.

In some embodiments, the adhesive tape is a seam sealing tape and the methods include positioning the adhesive layer of the seam sealing tape to the exterior surface of a butt-joint formed by two wood-based panels on the exterior of a building and applying manual pressure to the backing of the tape.

In this context, a "wood-based panel" is a sheet material that contains a significant amount of wood, e.g., in the form of strips, veneers, chips, strands, or fibres. It includes wood as well as engineered wood or wood composite materials, which are composites of wood and one or more other additives, such as adhesives or waxes. Examples include plywood, which is manufactured from thin layers or "plies" of wood veneer that are glued together, often with adjacent layers having their wood grain rotated up to 90 degrees to one another; particle board; chipboard; fiberboard, which is an engineered wood product made out of wood fibers, such as low-density fiberboard (LDF), medium-density fiberboard (MDF), and hardboard (high-density fiberboard, HDF); wafer board, which is manufactured from reconstituted wood wafers bonded with resins under heat and pressure; and oriented strand board ("OSB"). It also includes resin-impregnated (e.g., phenol-formaldehyde or isocyanate resin-impregnated) paper overlaid wood boards of the type described in U.S. Pat. No. 7,677,002 (Bennett et al.) and U.S. Pat. No. 6,737,155 (Ou). Examples include engineered wood panels with an oriented strand board core overlaid with phenol-formaldehyde resin-impregnated kraft paper or isocyanate resin-impregnated kraft paper. Such wood-based panels are commercially available, for example, from Huber Engineered Woods, Charlotte, NC.

The methods described herein can be carried out in any environment; however, particular advantage is realized in either a cold or a hot environment.

Herein, if an exterior surface of a building is in a "cold environment," the exterior surface of the building, or at least one wood-based panel of the building, has an average surface temperature of less than −18° C. (0° F.) or less than −21° C. (−5° F.). In some embodiments of a cold environment, the exterior surface of the building, or at least one wood-based panel of the building, has an average surface temperature of at least −29° C.
(−20° F.) or at least −23° C. (−10° F.).

Herein, if an exterior surface of a building is in a "hot environment," the exterior surface of the building, or at least one wood-based panel of the building, has an average surface temperature of at least 50° C. (122° F.) or at least 66° C. (150° F.). In some embodiments of a hot environment, the exterior surface of the building, or at least one wood-based panel of the building, has an average surface temperature of up to 82° C. (180° F.).

In some embodiments, the adhesive tape (in certain embodiments, having an adhesive layer thickness of 8 mils±0.5 mil (203 microns±13 microns) and a backing thickness of 4 mils±0.5 mil (102 microns±13 microns)) provides a peel adhesion from a resin-impregnated kraft paper overlaid oriented strand board (e.g., a phenol-formaldehyde resin-impregnated or isocyanate resin-impregnated kraft paper overlaid oriented strand board), after being adhered thereto for 24 hours at −10° F. (−23° C.), of at least 14 oz/in (15.3 N/dm) (or at least 15 oz/in (16.4 N/dm), or at least 20 oz/in (21.8 N/dm), or at least 24 oz/in (26.2 N/dm)) at a constant peel rate of 12 in/min (30.48 cm/min). This can be determined using Test Method 3, Low Temperature Peel Adhesion Test. To "Pass" this test, the peel adhesion is at least 14 oz/in (15.3 N/dm).

In some embodiments, the adhesive tape (in certain embodiments, having an adhesive layer thickness of 8 mils±0.5 mil (203 microns±13 microns) and a backing thickness of 4 mils±0.5 mil (102 microns±13 microns)) provides a peel adhesion from a resin-impregnated kraft paper overlaid oriented strand board (e.g., a phenol-formaldehyde resin-impregnated or isocyanate resin-impregnated kraft paper overlaid oriented strand board), after being adhered thereto for 24 hours at 150° F. (66° C.), of at least 14 oz/in (15.3 N/dm) (or at least 15 oz/in (16.4 N/dm), or at least 20 oz/in (21.8 N/dm), or at least 24 oz/in (26.2 N/dm))

at a constant peel rate of 12 in/min (30.48 cm/min). This can be determined using Test Method 3, High Temperature Peel Adhesion. To "Pass" this test, the peel adhesion is at least 14 oz/in (15.3 N/dm).

In some embodiments, the adhesive tape (in certain embodiments, having an adhesive layer thickness of 8 mils±0.5 mil (203 microns±13 microns) and a backing thickness of 4 mils±0.5 mil (102 microns±13 microns)) provides a shear adhesion from stainless steel at 158° F. (70° C.), of at least 100 minutes (or at least 1,000 minutes, or at least 5,000 minutes). This can be determined using Test Method 2, High Temperature Shear Test. To "Pass" this test, the shear adhesion is at least 100 minutes.

Pressure Sensitive Adhesive

The pressure sensitive adhesive used in the adhesive tapes of the present disclosure is an acrylic pressure sensitive adhesive. It includes a polymer formed from interpolymerized monomers that include:

one or more (meth)acrylic acid ester monomers of Formula (I):

wherein:
R is a branched alkyl having 10 to 18 carbon atoms; and
$R^3$ is H or $CH_3$,
one or more acid functional, ethylenically unsaturated monomers; and
optionally, one or more non-acid functional, ethylenically unsaturated polar monomers.

The resultant polymer may be crosslinked. The polymer may inherently have pressure sensitive adhesive properties. Alternatively, it may be mixed with various additives, such as a tackifier, to form the pressure sensitive adhesive.

(Meth)acrylic Acid Ester Monomer of Formula (I): The monomers used to form the polymers of the adhesive used in the tapes of the present disclosure include one or more (meth)acrylic acid ester monomers of Formula (I):

wherein: R is a branched alkyl having 10 to 18 carbon atoms; and $R^3$ is H or $CH_3$.

In certain embodiments, the monomers of Formula (I) have a homopolymer $T_g$ of less than 25° C., or less than 10° C.

Mixtures of monomers of Formula (I) may be used to make the polymer if desired.

In a first embodiment of the monomers of Formula (I), the monomers may be represented by the following (meth)acrylic acid ester monomers of Formula (II):

wherein: $R^1$ and $R^2$ are each independently a $C_1$ to $C_{16}$ saturated linear alkyl group; the sum of the number of carbons in $R^1$ and $R^2$ is 9 to 17 (in certain embodiments 9 to 11); and $R^3$ is H or $CH_3$. In this context, the term "linear alkyl" refers to a saturated linear hydrocarbon group including, for example, methyl, ethyl, n-propyl, n-butyl, and the like. Furthermore, it will be understood that in this formula $R^1$ and $R^2$ are not joined together to form a ring.

In certain embodiments, a mixture of structural isomers of the secondary alkyl (meth)acrylate of Formula (II) is used. An exemplary mixture of structural isomers of the secondary alkyl (meth)acrylate of Formula (II) includes: 15-85 mole-% of a 2-alkyl (meth)acrylate isomer; 5-50 mole-% of a 3-alkyl (meth)acrylate isomer; 0.5-40 mole-% of a 4-alkyl (meth)acrylate isomer; and 0-50 mole-% of at least one of a 5- through 15-alkyl (meth)acrylate isomer; wherein the mole percentages are based on the total moles of the secondary (meth)acrylate isomers used to make the polymer.

Examples of such monomers of Formula (II) include those disclosed in U.S. Pat. No. 9,102,774 (Clapper et al.).

In a second embodiment of the monomers of Formula (I), the monomers may be a (meth)acrylic acid ester monomer of a 2-alkyl alkanol, wherein the molar carbon number average of said 2-alkyl alkanol is 10 to 18. Examples of such monomers may be represented by the following monomers of Formula (III):

wherein: $R^{Guerbet}$ is derived from a $C_{10}$ to $C_{18}$ 2-alkyl alkanol; and $R^3$ is H or $CH_3$. In certain embodiments, the 2-alkyl alkanol (meth)acrylate ester monomers may be represented by the following Formula (IV):

wherein: $R^1$ and $R^2$ are each independently a $C_4$ to $C_{14}$ saturated, branched, or linear alkyl group; the sum of the number of carbons in $R^1$ and $R^2$ is 6 to 14; and $R^3$ is H or $CH_3$.

Examples of such monomers of Formulas (III) and (IV) include 2-propyl-1-heptyl acrylate, 2-butyl-1-octyl acrylate, as well as others disclosed in U.S. Pat. No. 8,137,807 (Clapper et al.).

In a third embodiment of the monomers of Formula (I), the monomers may be an alkyl (meth)acrylate ester of a primary alcohol R—OH the alkyl (meth)acrylate ester being the (meth)acrylic acid ester monomer represented by Formula (V):

wherein: R is a branched alkyl having 14 to 18 carbon atoms; and $R^3$ is H or $CH_3$. The primary alcohol R—OH has an iso number equal to at least 2 but no greater than 4. That is, the R group of the primary alcohol R—OH has 2-4 branch points.

Examples of such monomers of Formula (V) include heptadecyl acrylate as well as others disclosed in U.S. Pat. Pub. No. 2014/0377553 (Clapper et al.).

One or more (meth)acrylic acid ester monomers of Formula (I) may be present in an amount of up 99.9 parts by weight, or up to 99 parts by weight, based on 100 parts total monomers. One or more (meth)acrylic acid ester monomers of Formula (I) may be present in an amount of at least 80 parts by weight, or at least 90 parts by weight, based on 100 parts total monomers.

Acid-Functional Ethylenically Unsaturated Monomers: The monomers used to form the polymers of the adhesive used in the tapes of the present disclosure, further include one or more acid-functional ethylenically unsaturated monomers. The acid-functional group may be an acid per se, such as a carboxylic acid, or a portion may be salt thereof, such as an alkali metal carboxylate. Useful acid-functional, ethylenically unsaturated monomers include, but are not limited to, those selected from an ethylenically unsaturated carboxylic acid, ethylenically unsaturated sulfonic acid, ethylenically unsaturated phosphonic acid, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to then availability, an acid-functional monomer is generally selected from ethylenically unsaturated carboxylic acids (i.e., (meth)acrylic acids). When even stronger acids are desired, acidic monomers can include the ethylenically unsaturated sulfonic acids and ethylenically unsaturated phosphonic acids.

Such monomers, like acrylic acid, contribute to the desirable peel performance of the adhesive over a broad temperature range.

One or more acid-functional, ethylenically unsaturated monomers may be present in an amount of up to 20 parts by weight, up to 15 parts by weight, up to 10 parts by weight, up to 5 parts by weight, or up to 2 parts by weight, based on 100 parts total monomers. One or more acid-functional, ethylenically unsaturated monomers may be present in an amount of at least 0.1 part by weight, at least 0.5 part by weight, at least 1.0 part by weight, or at least 1.5 parts by weight, based on 100 parts total monomers. In certain embodiments, one or more acid-functional, ethylenically unsaturated monomers may be present in an amount of 0.1 part to 20 parts by weight, and in other embodiments 0.5 part to 2 parts by weight, based on 100 parts total monomers.

Optional Non-Acid-Functional Ethylenically Unsaturated Polar Monomers: The monomers used to form the polymers of the adhesive used in the tapes of the present disclosure may further include one or more non-acid-functional, ethylenically unsaturated polar monomers. A polar monomer useful in preparing the polymer of the present disclosure is both somewhat oil soluble and water soluble, resulting in a distribution of the polar monomer between the aqueous and oil phases in an emulsion polymerization. Such monomers are exclusive of acid-functionality and are referred to as a "non-acid functional, ethylenically unsaturated polar monomer."

Representative examples of suitable such polar monomers include, but are not limited to, 2-hydroxyethyl(meth)acrylate; 4-hydroxybutyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; a poly(alkoxyalkyl) (meth) acrylate including 2-(2-ethoxyethoxy)ethyl(meth)acrylate, 2-ethoxyethyl(meth)acrylate, 2-methoxyethoxyethyl(meth) acrylate, 2-methoxyethyl methacrylate, and a polyethylene glycol mono(meth)acrylate; an alkyl vinyl ether, including vinyl methyl ether; and mixtures thereof. Preferred polar monomers include those selected from the group consisting of 2-hydroxyethyl(meth)acrylate, N-vinylpyrrolidinone, and mixtures thereof.

If present, one or more non-acid-functional, ethylenically unsaturated polar monomers may be present in an amount of up 10 parts by weight, based on 100 parts total monomers. If present, one or more non-acid-functional, ethylenically unsaturated polar monomers may be present in an amount of at least 0.5 part by weight, based on 100 parts total monomers.

Other Optional Monomers: The monomers used to form the polymers of the adhesive used in the tapes of the present disclosure may thriller include one or more high $T_g$ monomers and/or one or more low $T_g$ monomers.

The low $T_g$ monomers may include one or more $C_1$ to $C_9$(meth)acrylate ester monomers having a homopolymer $T_g$ of less than 25° C., or less than 10° C. These are typically distinct monomers from the compounds of Formula (I). Examples of such monomers include an ester of either acrylic acid or methacrylic acid with a non-tertiary alkanol. Such as ethanol. 1-propanol. 2-propanol, 1-butanol, 2-butanol, 1-pentanol, 2-pentanol, 3 pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, and the like. In some embodiments, the preferred (meth)acrylate ester monomer is the ester of (meth)acrylic acid with butyl alcohol or isooctyl alcohol, or a combination thereof, although combinations of two or more different.

The high $T_g$ monomers may include one or more $C_1$ to $C_{20}$(meth)acrylate ester monomers having a homopolymer $T_g$ of at least 25° C., or at least 50° C. Examples of suitable high $T_g$ monomers useful in the present disclosure include, but are not limited to, t-butyl acrylate, methyl methacrylate, ethyl methacrylate, isopropyl methacrylate, n-butyl methacrylate, isobutyl methacrylate, sec-butyl methacrylate, t-butyl methacrylate, Stearyl methacrylate, phenyl methacrylate, cyclohexyl methacrylate, isobornyl acrylate, isobornyl methacrylate, benzyl methacrylate, 3,3,5-trimethylcyclohexyl acrylate, cyclohexyl acrylate, and combinations thereof.

Such optional monomers may be present in an amount of up to 20 parts by weight, up to 15 parts by weight, up to 10 parts by weight, up to 5 parts by weight, or up to 2 parts by weight, based on 100 parts total monomers. Such monomers may be present in an amount of at least 0.1 part by weight, at least 0.5 part by weight, at least 1.0 part by weight, or at least 1.5 parts by weight, based on 100 parts total monomers.

Crosslinking Mechanisms: In certain embodiments, the polymer of the adhesive used in the tapes of the present disclosure is crosslinked. Typically, such crosslinking improves durability and cohesion properties of the polymer. There are several crosslinking mechanisms for acrylic polymers (particularly, adhesives) including free-radical polymerization of multifunctional, ethylenically unsaturated groups with the other monomers, and covalent or ionic crosslinking through the functional monomers, such as acrylic acid. Another method is the use of UV crosslinkers, such as polymerizable benzophenones or post-added photocrosslinkers, such as multifunctional (meth)acrylates, multifunctional benzophenones, and triazines. A preferred crosslinker is a triazine, particularly for high temperature shear.

Crosslinking may also be achieved using high energy electromagnetic radiation such as gamma or e-beam radiation. In this case, in additional crosslinker may be required. One or more of these mechanisms can be used with the polymers described herein.

The amount of crosslinking and/or crosslinking agent included depends on well-understood factors such as the desired degree of crosslinking and/or the relative effectiveness of the crosslinking agent in the particular system, as measured by well-known tests such as shear adhesion. Crosslinking of the polymer using such crosslinking agents may be initiated using any conventional technique, such as thermal or radiation initiation.

If present, one or more crosslinkers may be present in an amount of up 0.1 part by weight, based on 100 parts total monomers. If present, one or more crosslinkers may be present in an amount of at least 0.05 part by weight, based on 100 parts total monomers.

Optional Additives: In some embodiments, the adhesive used in the tapes of the present disclosure may include one or more additives used to impart various properties. Examples of such optional additives include those selected from plasticizers, tackifiers, fillers, adhesion promoters, colorants (e.g., pigments and dyes), ultraviolet absorbers, antioxidants, and combinations thereof. Generally, the amounts of each additive would depend on the use of the adhesive composition.

A preferred additive is a plasticizer, which can be used to provide cold temperature performance. An example of a plasticizer is acetyl tributyl citrate.

Another preferred additive is a tackifier. The tackifier should be miscible with the polymer. Various types of suitable tackifiers include phenol modified terpenes and rosin esters such as glycerol esters of rosin and pentaerythritol esters of rosin that are available under the trade names NUROZ, NUTAC (Newport industries), PERMALYN, STAYBELITE, FORAL (Eastman). Also available are hydrocarbon resin tackifiers that typically come from C5 and C9 monomers by products of naphtha cracking and are available under the trade names PICCOTAC, EASTOTAC, REGALREZ, REGALITE (Eastman), ARKON (Arakawa), NORSOLENE, WINGTACK (Cray Valley), NEVTAC LX (Neville Chemical Co.), HIKOTACK, HIKOREZ (Kolon Chemical), NOVARES (Ruetgers QUINTONE (Leon), ESCOREZ (Exxon Mobile Chemical), NURES, and H-REZ (Newport Industries). In certain embodiments a tackifier selected from a hydrogenated terpene resin, a hydrogenated rosin resin, an esterified rosin resin, an aliphatic petroleum resin, an aromatic petroleum resin, an alicyclic petroleum resin obtained by hydrogenating aromatic petroleum resins, and combinations thereof. Preferably, the tackifier used is selected from hydrogenated C9 petroleum resins such as but not limited to REGALREZ tackifiers (Eastman) or ARKON (Arakawa) tackifiers. If used, a tackifier may be used in an amount of up to 20 wt-%, based on the total weight of the pressure sensitive adhesive.

Backing

In some embodiments of the tapes of the present disclosure, the backing is a multilayer backing. A multilayer backing includes at least 2 layers. Exemplary multilayer backings are shown in the adhesive tapes of FIGS. 1 and 2, described above.

In the adhesive tape of FIG. 1 that includes a two-layer backing (i.e., backing film), an adhesive layer is bonded directly to the second major surface of the core layer. In the adhesive tape of FIG. 2 that includes a three-layer backing film, an adhesive layer is bonded directly to the second skin layer on a surface opposite the core layer.

The backings are in the form of a film, typically with a thickness of 0.5 mil to 300 mils (13 microns to 7,600 microns).

The backing films described herein contribute to the adhesive tapes having good tensile strength, tear resistance, slip resistance (static friction performance), ability to seal over nails with resistance to water penetration, and resistance to wrinkling under hot weather conditions. In particular, tapes that include the backing films described herein demonstrate high resistance to wrinkling under hot weather conditions, while maintaining other characteristics desirable in adhesive tapes.

An exemplary multilayer backing includes a core layer, a first skin layer, and optionally a second skin layer. In some embodiments, the core layer includes a polyolefin, and the shin layer(s) include a thermoplastic elastomer. Exemplary such backings are described in U.S. Pat. Pub. No. 2019/0031923 (Khurana et al.).

In some embodiments, the multilayer backing includes: a core layer, having a first major surface opposite a second major surface, and having a core layer thickness of 10.0 to 4,500 microns; and a skin layer having a different composition from the core layer, having a skin layer thickness of 3.0 to 1,500 microns but not more than 50% of the core layer thickness, bonded directly to the first major surface of the core layer.

In certain embodiments, the backing has a coefficient of thermal expansion of less than 90 ppm/° C. as measured in at least one direction within the plane of the backing. In certain embodiments, the backing has a coefficient of thermal expansion of not more than 99 ppm/° C. as measured in any direction within the plane of the backing. This coefficient of thermal expansion is generally lower than conventional backings, which is believed to contribute to a resistance to wrinkling under hot weather conditions.

Core Layer: In certain embodiments, the core layer of the backing includes at least 50 wt-% of a polyolefin. In certain embodiments, the core layer of the backing includes at least 60 wt-%, at least 70 wt-%, at least 75 wt-%, at least 80 wt-%, at least 85 wt-%, at least 90 wt-%, or at least 95 wt-%, of a polyolefin. The core layer may also include additives, such as a pigment (e.g., carbon black) and a UV stabilizer, In certain embodiments, the polyolefin core layer includes a propylene/ethylene polymer. In certain embodiments, the propylene/ethylene polymer includes propylene and ethylene in a weight ratio of at least 2:1 (or at least 3:1, or at least 4:1) propylene/ethylene.

Skin Layer(s): In certain embodiments, the skin layer includes at least 50 wt-% of a thermoplastic elastomer. In certain embodiments, the skin layer includes at least 60 wt-%, at least 70 wt-%, at least, at least 75 wt-%, at least 80 wt-%, at least 85 wt-%, at least 90 wt-%, or at least 95 wt-%, of a thermoplastic elastomer. In certain embodiments, the thermoplastic elastomer is a polymer of ethylene. In certain embodiments, the thermoplastic elastomer is selected from an ethylene vinyl acetate polymer, an ethylene methyl acrylate polymer, and a combination thereof.

In certain embodiments, the backing further includes a second skin layer positioned between the second major surface of the core layer and the adhesive layer; wherein the second skin layer has a different composition than the core layer, and has a second skin layer thickness of 3.0 microns to 1,500 microns but not more than 50% of the core layer thickness.

In certain embodiments, the second skin layer includes at least 50 wt-% of a thermoplastic elastomer. In certain embodiments, the second skin layer includes at least 60 wt-%, at least 70 wt-%, at least, at least 75 wt-%, at least 80 wt-%, at least 85 wt-%, at least 90 wt-%, or at least 95 wt-%, of a thermoplastic elastomer. In certain embodiments, the thermoplastic elastomer is a polymer of ethylene. In certain embodiments, the thermoplastic elastomer of the second skin layer is selected from an ethylene vinyl acetate polymer, an ethylene methyl acrylate polymer, and a combination thereof. In certain embodiments, the second skin layer has the same composition as the first skin layer.

Optional Low Adhesion Backsize: In some embodiments, the backing has an additional layer of a low adhesion backsize or release material (not shown in FIG. 1 or 2), such as a silicone or polyvinyl octadecyl carbamate coating, in a thickness as would be known to one of skill in the art. Such material is coated on the outermost surface of the backing opposite that of the adhesive layer.

Method of Making Backing, Adhesive, and Tape: The backing may be made using conventional techniques, such as blown film methods, coating methods, and the like.

In some embodiments, the polymers of the adhesive used in the tapes of the present disclosure may be polymerized through any known polymerization methods including thermally activated and photoinitiated methods. For example, in some embodiments, the raw materials (e.g., monomers, free radical initiator (e.g., thermal or photoinitiator), chain transfer agent, and solvent, as needed) may be combined in the appropriate ratios at room temperature to target the desired final polymer composition. The reaction mixture may be purged with an inert gas. The reaction mixture may be exposed to appropriate UV-VIS radiation depending on the photoinitiator to produce a polymer. The resultant polymer may then be combined with a desired crosslinker under appropriate conditions to produce a crosslinked polymer. The crosslinked polymer may have sufficient adhesive properties, e.g., PSA properties, or optional additives (e.g., plasticizers and tackifiers) may be added in amounts as appropriate subsequent to polymer formation to provide desirable properties (e.g., adhesive properties).

The adhesive may be made directly on the backing, or the pre-made adhesive may be applied to the backing to form a tape using conventional techniques, such as coating methods. For example, the adhesive can be applied to the backing by methods such as roller coating, flow coating, dip coating, spin coating, spray coating, knife coating, and the coating. These various methods of coating allow the compositions to be placed on the backing at variable thicknesses. Typically, the adhesive thickness is 5 to 12 mils (127 to 305 microns) (dry thickness).

Embodiments

Embodiment 1 is an adhesive tape comprising an acrylic pressure sensitive adhesive layer disposed on a multilayer backing, wherein:
the acrylic pressure sensitive adhesive comprises a polymer comprising interpolymerized monomers comprising:
80 to 99.9 parts by weight of one or more (meth)acrylic acid ester monomers of Formula (I):

RO—C(O)—C($R^3$)=$CH_2$ wherein:
R is a branched alkyl having 10 to 18 carbon atoms; and
$R^3$ is H or $CH_3$;
0.1 to 20 parts by weight of one or more acid-functional, ethylenically unsaturated monomers; and
0 to 10 parts by weight of one or more non-acid functional, ethylenically unsaturated polar monomers; and
the multilayer backing comprises:
a core layer, having a first major surface opposite a second major surface, and having a core layer thickness of 10.0 to 4,500 microns; and
a skin layer having a different composition from the core layer, having a skin layer thickness of 3.0 to 1,500 microns but not more than 50% of the core layer thickness, bonded directly to the first major surface of the core layer;
wherein the acrylic pressure sensitive adhesive layer is disposed on (directly or indirectly) the second major surface of the core layer.

Embodiment 2 is the adhesive tape of embodiment 1 wherein the (meth)acrylic acid ester monomers of Formula (I) have a homopolymer $T_g$ of less than 25° C., or less than 10° C.

Embodiment 3 is the adhesive tape of embodiment 1 or 2 wherein the interpolymerized monomers comprise at least 90 parts by weight of one or more (meth)acrylic acid ester monomers of Formula (I).

Embodiment 4 is the adhesive tape of any of embodiments 1 through 3 wherein the interpolymerized monomers comprise up to 99 parts by weight of one or more (meth)acrylic acid ester monomers of Formula (I).

Embodiment 5 is the adhesive tape of any of embodiments 1 through 4 wherein the (meth)acrylic acid ester monomers of Formula (I) comprise one or more secondary alkyl (meth)acrylate monomers of Formula (II):

wherein: $R^1$ and $R^2$ are each independently a $C_1$ to $C_{16}$ saturated linear alkyl group; the sum of the number of carbons in $R^1$ and $R^2$ is 9 to 17 (in certain embodiments, 9 to 11); and $R^3$ is H or $CH_3$.

Embodiment 6 is the adhesive tape of embodiment 5 wherein the acrylic pressure sensitive adhesive comprises a polymer comprising interpolymerized monomers comprising: 80 to 99.9 parts by weight of a mixture of structural isomers of the secondary alkyl (meth)acrylate of Formula (II); 0.1 to 20 parts by weight of an acid-functional ethylenically unsaturated monomer; and 0 to 10 parts by weight of a non-acid functional, ethylenically unsaturated polar monomer.

Embodiment 7 is the adhesive tape of embodiment 6 wherein the mixture of structural isomers of a secondary alkyl (meth)acrylate of Formula (II) comprise: 15-85 mole-% of a 2-alkyl (meth)acrylate isomer; 5-50 mole-% of a 3-alkyl (meth)acrylate isomer; 0.5-40 mole-% of a 4-alkyl (meth)acrylate isomer; and 0-50 mole-% of at least one of a 5- through 15-alkyl (meth)acrylate isomer; wherein the mole percentages are based on the total moles of (meth)acrylate isomers used to make the polymer.

Embodiment 8 is the adhesive tape of any of embodiments 1 through 7 wherein the (meth)acrylic acid ester monomers of Formula (I) comprise one or more (meth) acrylic acid ester monomers of a 2-alkyl alkanol having a molar carbon number average of 10 to 18.

Embodiment 9 is the adhesive tape of embodiment 8 wherein the (meth)acrylic acid ester of a 2-alkyl alkanol is represented by the following Formula (III):

wherein: $R^{Guerbet}$ is derived from a $C_{10}$ to $C_{18}$ 2-alkyl alkanol; and $R^3$ is H or $CH_3$.

Embodiment 10 is the adhesive tape of embodiment 8 wherein the (meth)acrylic acid ester of a 2-alkyl alkanol is represented by the following Formula (IV):

wherein: $R^1$ and $R^2$ are each independently a $C_4$ to $C_{14}$ saturated, branched, or linear alkyl group; the sum of the number of carbons in $R^1$ and $R^2$ is 6 to 14; and $R^3$ is H or $CH_3$.

Embodiment 11 is the adhesive tape of any of embodiments 1 through 10 wherein the (meth)acrylic acid ester monomers of Formula (I) comprise an alkyl (meth)acrylate ester of a primary alcohol of the formula R—OH, wherein:
the alkyl (meth)acrylate ester is the (meth)acrylic acid ester monomer represented by Formula (V):

wherein:
R is a branched alkyl having 14 to 18 carbon atoms; and
$R^3$ is H or $CH_3$; and
the primary alcohol R—OH has an iso number equal to at least 2 but no greater than 4.

Embodiment 12 is the adhesive tape of any of embodiments 1 through 11 wherein the interpolymerized monomers comprise up to 15 parts by weight (up to 10 parts by weight, up to 5 parts by weight, or up to 2 parts by weight) of one or more acid-functional, ethylenically unsaturated monomers.

Embodiment 13 is the adhesive tape of any of embodiments 1 through 12 wherein the interpolymerized monomers comprise at least 0.5 part by weight (at least 1.0 part by weight, or at least 1.5 parts by weight) of one or more acid-functional, ethylenically unsaturated monomers.

Embodiment 14 is the adhesive tape of any of embodiments 1 through 13 wherein the acid-functional, ethylenically unsaturated monomers are selected from an ethylenically unsaturated carboxylic acid, ethylenically unsaturated sulfonic acid, ethylenically unsaturated phosphonic acid, and mixtures thereof.

Embodiment 15 is the adhesive tape of any of embodiments 1 through 14 wherein the interpolymerized monomers comprise at least 0.5 part by weight of one or more non-acid functional, ethylenically unsaturated polar monomers.

Embodiment 16 is the adhesive tape of any of embodiments 1 through 15 wherein the non-acid functional, ethylenically unsaturated polar monomers are selected from the group of 2-hydroxyethyl(meth)acrylate; 4-hydroxybutyl (meth)acrylate, N-vinylpyrrolidone; N-vinylcaprolactam, acrylamide; mono- or di-N-alkyl substituted acrylamide, t-butyl acrylamide; dimethylaminoethyl acrylamide; N-octyl acrylamide; a poly(alkoxyalkyl) (meth)acrylate; an alkyl vinyl ether; and mixtures thereof.

Embodiment 17 is the adhesive tape of any of embodiments 1 through 16 wherein the acrylic pressure sensitive adhesive comprises a polymer comprising interpolymerized monomers further comprising one or more $C_1$ to $C_9$(meth) acrylate ester monomers having a homopolymer of less than 25° C. (or less than 10° C.).

Embodiment 18 is the adhesive tape of embodiment 17 wherein the interpolymerized monomers comprise up to 20 parts by weight (up to 15 parts by weight, up to 10 parts by weight, up to 5 parts by weight, or up to 2 parts by weight) of one or more $C_1$ to $C_9$(meth)acrylate ester monomers having a homopolymer $T_g$ of less than 25° C.

Embodiment 19 is the adhesive tape of embodiment 17 or 18 wherein the interpolymerized monomers comprise at least 0.1 part by weight (at least 0.5 part by weight, at least 1.0 part by weight, or at least 1.5 parts by weight) of one or more $C_1$ to $C_9$(meth)acrylate ester monomers having a homopolymer $T_g$ of less than 25° C.

Embodiment 20 is the adhesive tape of any of embodiments 1 through 19 wherein the acrylic pressure sensitive adhesive comprises a polymer comprising interpolymerized monomers further comprising one or more $C_1$ to $C_{20}$(meth) acrylate ester monomers having a homopolymer $T_g$ of at least 25° C. (or at least 50° C.).

Embodiment 21 is the adhesive tape of embodiment 20 wherein the interpolymerized monomers comprise up to 20 parts by weight (up to 15 parts by weight, up to 10 parts by weight, up to 5 parts by weight, or up to 2 parts by weight) of one or more $C_1$ to $C_{20}$(meth)acrylate ester monomers having a homopolymer $T_g$ of at least 25° C.

Embodiment 22 is the adhesive tape of embodiment 20 or 21 wherein the interpolymerized monomers comprise at least 0.1 part by weight (at least 0.5 part by weight, at least 1.0 part by s'eight, or at least 1.5 parts by weight) of one or more $C_1$ to $C_{20}$(meth)acrylate ester monomers having a homopolymer $T_g$ of at least 25° C.

Embodiment 23 is the adhesive tape of any of embodiments 1 through 22 wherein the polymer is crosslinked.

Embodiment 24 is the adhesive tape of embodiment 23 wherein the interpolymerized monomers further comprise a crosslinker (in certain embodiments, in an amount of up 0.1 part by weight, based on 100 parts total monomers; in certain embodiments, in an amount of at least 0.05 part by weight, based on 100 parts total monomers).

Embodiment 25 is the adhesive tape of embodiment 24 wherein the crosslinker comprises a triazine crosslinker.

Embodiment 26 is the adhesive tape of any of embodiments 1 through 25 wherein the acrylic pressure sensitive adhesive further comprises a tackifier.

Embodiment 27 is the adhesive tape of embodiment 26 wherein the acrylic pressure sensitive adhesive comprises up to 20 wt-% of a tackifier, based on the total weight of the pressure sensitive adhesive.

Embodiment 28 is the adhesive tape of any of embodiments 1 through 27 wherein the acrylic pressure sensitive adhesive layer has a thickness of 5 to 12 mils (127 to 305 microns) (in certain embodiments, 8 mils±0.5 mil (203 microns±13 microns)).

Embodiment 29 is the adhesive tape of any of embodiments 1 through 28 wherein the backing has a coefficient of thermal expansion of less than 90 ppm/° C. as measured in at least one direction within the plane of the backing.

Embodiment 30 is the adhesive tape of any of embodiments 1 through 29 wherein the backing has a coefficient of thermal expansion of not more than 99 ppm/° C. as measured in any direction within the plane of the backing.

Embodiment 31 is the adhesive tape of any of embodiments 1 through 30 wherein the core layer comprises at least 50 wt-% of a polyolefin.

Embodiment 32 is the adhesive tape of embodiment 31 wherein the polyolefin core layer comprises a propylene/ethylene polymer comprising propylene and ethylene in a weight ratio of at least 2:1 propylene/ethylene.

Embodiment 33 is the adhesive tape of any of embodiments 1 through 32 wherein the skin layer comprises at least 50 wt-% of a thermoplastic elastomer.

Embodiment 34 is the adhesive tape of embodiment 33 wherein the thermoplastic elastomer is selected from an ethylene vinyl acetate polymer, an ethylene methyl acrylate polymer, and a combination thereof.

Embodiment 35 is the adhesive tape of any of embodiments 1 through 34 wherein the skin layer is a first skin layer and the backing further comprises a second skin layer positioned between the second major surface of the core layer and the adhesive layer; wherein the second skin layer has a different composition than the core layer, and has a second skin layer thickness of 3.0 microns to 1,500 microns but not more than 50% of the core layer thickness.

Embodiment 36 is the adhesive tape of embodiment 35 wherein the second skin layer comprises at least 50 wt-% of a thermoplastic elastomer.

Embodiment 37 is the adhesive tape of embodiment 36 wherein the thermoplastic elastomer of the second skin layer is selected from an ethylene vinyl acetate polymer, an ethylene methyl acrylate polymer, and a combination thereof.

Embodiment 38 is the adhesive tape of any of embodiments 35 through 37 wherein the second skin layer has a different composition than the first skin layer.

Embodiment 39 is the adhesive tape of any of embodiments 1 through 38 wherein the adhesive tape having an adhesive layer thickness of 8 mils±0.5 mil (203 microns±13 microns) and a backing thickness of 4 mils±0.5 mil (102 microns±13 microns) provides a peel adhesion from a resin-impregnated kraft paper overlaid oriented strand board (e.g., a phenol-formaldehyde resin-impregnated or isocyanate resin-impregnated kraft paper overlaid oriented strand board), after being adhered thereto for 24 hours at −10° F. (−23° C.), of at least 14 oz/in (15.3 N/dm) (or at least 15 oz/in (16.4 N/dm), or at least 20 oz/in (21.8 N/dm), or at least 24 oz/in (26.2 N/dm)) at a constant peel rate of 12 in/min (30.48 cm/min).

Embodiment 40 is the adhesive tape of any of embodiments 1 through 39 wherein the adhesive tape having an adhesive layer thickness of 8 mils±0.5 mil (203 microns±13 microns) and a backing thickness of 4 mils±0.5 mil (102 microns±13 microns) provides a peel adhesion from a resin-impregnated kraft paper overlaid oriented strand board (e.g., a phenol-formaldehyde resin-impregnated or isocyanate resin-impregnated kraft paper overlaid oriented strand board), after being adhered thereto for 24 hours at 150° F. (66° C.), of at least 14 oz/in (15.3 N/dm) (or at least 15 oz/in (16.4 N/dm), or at least 20 oz/in (21.8 N/dm), or at least 24 oz/in (26.2 N/dm)) at a constant peel rate of 12 in/min (30.48 cm/min).

Embodiment 41 is the adhesive tape of any of embodiments 1 through 40 wherein the adhesive tape having an adhesive layer thickness of 8 mils±0.5 mil (203 microns±13 microns) and a backing thickness of 4 mils±0.5 mil (102 microns±13 microns) provides a shear adhesion from stainless steel at 158° F. (70° C.), of at least 100 minutes (or at least 1,000 minutes, or at least 5,000 minutes).

Embodiment 42 is the adhesive tape of any of embodiments 1 through 41 which is a seam sealing tape.

Embodiment 43 is a method of applying the adhesive tape of any of embodiments 1 through 42 to an exterior surface of a building, the method comprising: positioning the adhesive layer of the adhesive tape to the exterior surface of at least one wood-based panel on the exterior of a building; and applying manual pressure to the backing of the tape.

Embodiment 44 is the method of embodiment 43 wherein the exterior surface of the building is in a cold environment and the at least one wood-based panel has an average surface temperature of less than −18° C.

Embodiment 45 is the method of embodiment 43 wherein the exterior surface of the building is in a hot environment and the at least one wood-based panel has an average surface temperature of at least 50° C.

Embodiment 46 is a method of applying the seam sealing tape of embodiment 42 to an exterior surface of a building in a cold environment, the method comprising: positioning the adhesive layer of the seam sealing tape to the exterior surface of a butt-joint formed by two wood-based panels on the exterior of a building, wherein the exterior surface of the two wood-based panels have an average surface temperature of less than −18° C.; and applying manual pressure to the backing of the tape.

Embodiment 47 is a method of applying the seam sealing tape of embodiment 42 to an exterior surface of a building in a hot environment, the method comprising: positioning the adhesive layer of the seam sealing tape to the exterior surface of a butt-joint formed by two wood-based panels on the exterior of a building, wherein the exterior surface of the two wood-based panels have an average surface temperature of at least 50° C.; and applying manual pressure to the backing of the tape.

Embodiment 48 is a method of applying an adhesive tape to an exterior surface of a building, wherein the adhesive tape comprises a pressure sensitive adhesive layer disposed on a backing, the method comprising: positioning the adhesive layer of the adhesive tape to the exterior surface of at least one wood-based panel on the exterior of a building; wherein the exterior surface of the building is in a cold environment and the at least one wood-based panel has an average surface temperature of less than −18° C.; and applying manual pressure to the backing of the tape; wherein the adhesive tape passes the Low Temperature Peel Adhesion Test at −10° F. (−23° C.).

Embodiment 49 is the method of embodiment 48 wherein the adhesive tape passes the Low Temperature Peel Adhesion Test at −20° F. (−29° C.).

Embodiment 50 is the method of embodiment 48 or 49 wherein the adhesive tape passes the High Temperature Peel Adhesion Test at 150° F. (66° C.).

Embodiment 51 is the method of any of embodiments 48 through 50 wherein the adhesive tape passes the High Temperature Shear Test.

Embodiment 52 is the method of any of embodiments 48 through 51 wherein the adhesive tape comprises an acrylic pressure sensitive adhesive layer disposed on a multilayer backing.

Embodiment 53 is the method of embodiment 52 wherein the acrylic pressure sensitive adhesive comprises a polymer comprising interpolymerized monomers comprising:

80 to 99.9 parts by weight of one or more (meth)acrylic acid ester monomers of Formula (I):

RO—C(O)—C($R^3$)=$CH_2$ wherein:
R is a branched alkyl having 10 to 18 carbon atoms; and
$R^3$ is H or $CH_3$;

0.1 to 20 parts by weight of one or more acid-functional, ethylenically unsaturated monomers; and 0 to 10 parts by weight of one or more non-acid functional, ethylenically unsaturated polar monomers.

Embodiment 54 is the method of embodiment 52 or 53 wherein the multilayer backing comprises: a core layer, having a first major surface opposite a second major surface, and having a core layer thickness of 10.0 to 4,500 microns; and a skin layer having a different composition from the core layer, having a skin layer thickness of 3.0 to 1,500 microns but not more than 50% of the core layer thickness, bonded directly to the first major surface of the core layer; wherein the acrylic pressure sensitive adhesive layer is disposed on the second major surface of the core layer.

Embodiment 55 is the method of embodiment 53 or 54 wherein the (meth)acrylic acid ester monomers of Formula (I) comprise a secondary alkyl (meth)acrylate of Formula (II):

wherein: $R^1$ and $R^2$ are each independently a $C_1$ to $C_{16}$ saturated linear alkyl group; the sum of the number of carbons in $R^1$ and $R^2$ is 9 to 17; and $R^3$ is H or $CH_3$.

Embodiment 56 is the method of any of embodiments 53 through 55 wherein the (meth)acrylic acid ester monomers of Formula (I) comprise a (meth)acrylic acid ester of a 2-alkyl alkanol having a molar carbon number average of 10 to 18.

Embodiment 57 is the method of embodiment 56 wherein the (meth)acrylic acid ester of a 2-alkyl alkanol is represented by the following Formula (III):

wherein: $R^{Guerbet}$ is derived from a $C_{10}$ to $C_{18}$ 2-alkyl alkanol; and $R^3$ is H or $CH_3$.

Embodiment 58 is the method of embodiment 56 wherein the (meth)acrylic acid ester of a 2-alkyl alkanol is represented by the following Formula (IV):

wherein: $R^1$ and $R^2$ are each independently a $C_4$ to $C_{14}$ saturated, branched, or linear alkyl group; the sum of the number of carbons in $R^1$ and $R^2$ is 6 to 14; and $R^3$ is H or $CH_3$.

Embodiment 59 is the method of any of embodiments 53 through 58 wherein the (meth)acrylic acid ester monomers of Formula (I) comprise an alkyl (meth)acrylate ester of a primary alcohol of the formula R—OH, wherein:
the alkyl (meth)acrylate ester is the (meth)acrylic acid ester monomer represented by Formula (V):

RO—C(O)—C($R^3$)=$CH_2$ wherein:
R is a branched alkyl having 14 to 18 carbon atoms; and
$R^3$ is H or $CH_3$; and
the primary alcohol R—OH has an iso number equal to at least 2 but no greater than 4.

Embodiment 60 is the adhesive tape of any of embodiments 53 through 59 wherein the one or more acid-functional, ethylenically unsaturated monomers are selected from an ethylenically unsaturated carboxylic acid, ethylenically unsaturated sulfonic acid, ethylenically unsaturated phosphonic acid, and mixtures thereof.

Embodiment 61 is the method of any of embodiments 53 through 60 wherein the one or more non-acid functional, ethylenically unsaturated polar monomers are selected from the group of 2-hydroxyethyl(meth)acrylate; 4-hydroxybutyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; a poly(alkoxyalkyl) (meth)acrylate; an alkyl vinyl ether; and mixtures thereof.

Embodiment 62 is the method of any of embodiments 53 through 61 wherein the interpolymerized monomers further comprise a crosslinker ill an amount of 0.05 to 0.1 part by weight, based on 100 parts total monomers.

Embodiment 63 is the method of any of claims 53 through 62 wherein the acrylic pressure sensitive adhesive further comprises a tackifier.

Embodiment 64 is the method of any of embodiments 54 through 63 wherein the skin layer is a first skin layer and the backing further comprises a second skin layer positioned between the second major surface of the core layer and the adhesive layer; wherein the second skin layer has a different composition than the core layer, and has a second skin layer thickness of 3.0 microns to 1,500 microns but not more than 50% of the core layer thickness.

Embodiment 65 is the method of any of embodiments 48 through 64 wherein the backing has a coefficient of thermal expansion of less than 90 ppm/° C. as measured in at least one direction within the plane of the backing.

Embodiment 66 is a method of applying an adhesive tape to an exterior surface of a building, wherein the adhesive tape comprises a pressure sensitive adhesive layer disposed on a backing, the method comprising: positioning the adhesive layer of the adhesive tape to the exterior surface of at least one wood-based panel on the exterior of a building; wherein the exterior surface of the building is in a hot environment and the at least one wood-based panel has an average surface temperature of at least 50° C.; and applying manual pressure to the backing of the tape; wherein the adhesive tape passes the High Temperature Shear Test.

Embodiment 67 is the method of embodiment 66 wherein the adhesive tape passes the High Temperature Peel Adhesion Test at 150° F. (66° C.).

Embodiment 68 is the method of embodiment 66 or 67 wherein the adhesive tape passes the Low Temperature Peel Adhesion Test at −10° F. (−23° C.).

Embodiment 69 is the method of embodiment 68 wherein the adhesive tape passes the Low Temperature Peel Adhesion Test at −20° F. (−29° C.).

Embodiment 70 is the method of any of embodiments 66 through 69 wherein the adhesive tape comprises an acrylic pressure sensitive adhesive layer disposed on a multilayer backing.

Embodiment 71 is the method of embodiment 70 wherein the acrylic pressure sensitive adhesive comprises a polymer comprising interpolymerized monomers comprising:
   80 to 99.9 parts by weight of one or more (meth)acrylic acid ester monomers of Formula (I):

wherein:
      R is a branched alkyl having 10 to 18 carbon atoms; and
      $R^3$ is H or $CH_3$;
   0.1 to 20 parts by weight of one or more acid-functional, ethylenically unsaturated monomers; and
   0 to 10 parts by weight of one or more non-acid functional, ethylenically unsaturated polar monomers.

Embodiment 72 is the method of embodiment 70 or 71 wherein the multilayer backing comprises: a core layer, having a first major surface opposite a second major surface, and having a core layer thickness of 10.0 to 4,500 microns; and a skin layer having a different composition from the core layer, having a skin layer thickness of 3.0 to 1,500 microns but not more than 50% of the core layer thickness, bonded directly to the first major surface of the core layer; wherein the acrylic pressure sensitive adhesive layer is disposed on the second major surface of the core layer.

Embodiment 73 is the method of embodiment 71 or 72 wherein the (meth)acrylic acid ester monomers of Formula (I) comprise a secondary alkyl (meth)acrylate of Formula (II):

wherein: $R^1$ and $R^2$ are each independently a $C_1$ to $C_{16}$ saturated linear alkyl group; the sum of the number of carbons in $R^1$ and $R^2$ is 9 to 17; and $R^3$ is H or $CH_3$.

Embodiment 74 is the method of any of embodiments 71 through 73 wherein the (meth)acrylic acid ester monomers of Formula (I) comprise a (meth)acrylic acid ester of a 2-alkyl alkanol having a molar carbon number average of 10 to 18.

Embodiment 75 is the method of embodiment 74 wherein the (meth)acrylic acid ester of a 2-alkyl alkanol is represented by the following Formula (III):

wherein: $R^{Guerbet}$ is derived from a $C_{10}$ to $C_{18}$ 2-alkyl alkanol; and $R^3$ is H or $CH_3$.

Embodiment 76 is the method of embodiment 74 wherein the (meth)acrylic acid ester of a 2-alkyl alkanol is represented by the following Formula (IV):

wherein: $R^1$ and $R^2$ are each independently a $C_4$ to $C_{14}$ saturated, branched, or linear alkyl group; the sum of the number of carbons in $R^1$ and $R^2$ is 6 to 14; and $R^3$ is H or $CH_3$.

Embodiment 77 is the method of any of embodiments 71 through 76 wherein the (meth)acrylic acid ester monomers of Formula (I) comprise an alkyl (meth)acrylate ester of a primary alcohol of the formula R—OH, wherein:
   the alkyl (meth)acrylate ester is the (meth)acrylic acid ester monomer represented by Formula (V):

wherein:
      R is a branched alkyl having 14 to 18 carbon atoms; and
      $R^3$ is H or $CH_3$; and
   the primary alcohol R—OH has an iso number equal to at least 2 but no greater than 4.

Embodiment 78 is the adhesive tape of any of embodiments 71 through 77 wherein the one or more acid-functional, ethylenically unsaturated monomers are selected from an ethylenically unsaturated carboxylic acid, ethylenically unsaturated sulfonic acid, ethylenically unsaturated phosphonic acid, and mixtures thereof.

Embodiment 79 is the method of any of embodiments 71 through 78 wherein the one or more non-acid functional, ethylenically unsaturated polar monomers are selected from the group of 2-hydroxyethyl(meth)acrylate; 4-hydroxybutyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; a poly(alkoxyalkyl) (meth)acrylate; an alkyl vinyl ether; and mixtures thereof.

Embodiment 80 is the method of any of embodiments 71 through 79 wherein the interpolymerized monomers further comprise a crosslinker in an amount of 0.05 to 0.1 part by tight, based on 100 parts total monomers.

Embodiment 81 is the method of any of claims 71 through 80 wherein the acrylic pressure sensitive adhesive further comprises a tackifier.

Embodiment 82 is the method of any of embodiments 72 through 81 wherein the skin layer is a first skin layer and the backing further comprises a second skin layer positioned between the second major surface of the core layer and the adhesive layer; wherein the second skin layer has a different composition than the core layer, and has a second skin layer thickness of 3.0 microns to 1,500 microns but not more than 50% of the core layer thickness.

Embodiment 83 is the method of any of embodiments 66 through 82 wherein the backing has a coefficient of thermal expansion of less than 90 ppm/° C. as measured in at least one direction within the plane of the backing.

EXAMPLES

Objects and advantages of this disclosure are further illustrated by the following examples, but the particular materials and amounts thereof recited in these examples, as well as other conditions and details, should not be construed to unduly limit this disclosure.

Unless otherwise noted, all parts, percentages, ratios, etc. in the examples and the rest of the specification are by weight, and all reagents used in the examples were obtained, or are available, from general chemical suppliers such as, for example, Sigma-Aldrich, St. Louis, MO, or may be synthesized by conventional methods. The following abbreviations are used in this section: mL=milliliter, min=minutes, h=hours, sec=second, g=gram, mg=milligram, m=meter, centimeter=cm, mm=millimeter, μm=micrometer or micron, ° C.=degrees Celsius, ° F.=degrees Fahrenheit, N=Newton, oz=ounce, mW/cm$^2$=milliWatts per square centimeter, ppm=parts per million, wt-%=weight percent, wt %=weight percent, dm=decimeter. Unless otherwise noted, all parts, percentages, ratios, etc. in the Examples and the rest of the specification are by weight.

Test Method 1: Room Temperature Peel Adhesion Test

Peel adhesion strength was measured at 74° F. (23° C.) and 50% relative humidity (RH) using an IMASS Model 2100 Slip/Peel Tester (Instrumentors Incorporated, Strongsville, OH) equipped with a 25 pound load cell. A tape test specimen measuring 1.0 inch (2.54 centimeters) wide by approximately 6 inches (15.2 centimeters) long was applied to a coupon of Exterior Sheathing substrate that had been wiped once with a lint free tissue prior to use. A 2.2-kilogram rubber roller was rolled back and forth four times over a 5-inch (12.70-centimeter) length of the test specimen to ensure intimate contact with the substrate surface. The free end of the tape test specimen was folded on itself and attached to the load cell apparatus making angle of 90° between the tape test specimen and the substrate. The substrate was attached to the 90° peel test accessory fixed to the moveable platen on the instrument. The peel test was run at a constant rate of 12 inches/minutes (30.48 centimeters/minute) and the average peel force was recorded in ounces/0.5 inch and normalized to ounces/inch. Six test specimens were evaluated and the results used to obtain an average value in ounces/inch.

Test Method 2: High Temperature Shear Test

Shear adhesion strength on a stainless steel (SS) substrate was determined at 70° C. (158° F.) as follows. A tape test specimen measuring 1 inch (2.54 centimeters) width and approximately 5 inches (12.7 centimeters) long was adhered to a flat, rigid stainless steel substrate that had been wiped once with methyl ethyl ketone (MEK) and a lint-free tissue prior to use. Exactly 1 inch (2.54 centimeters) of length of the test specimen was adhered to the substrate and the remaining length extended beyond the edge of the substrate. A 2.2-kilogram rubber roller was rolled back and forth one time over the adhered portion. All prepared plates equilibrated in a 70° C. oven for 10 minutes, then placed in a hanging rack, at 70° C., that supported the substrate at an angle of 2 degrees from vertical. A 500-gram weight was hung from the free end of the adhered test specimen. All prepared plates were placed in the hanging rack within one hour of initial adhesion of the specimen to the substrate. The time (in minutes) at which the weight fell due to the test specimen releasing from the plate, was recorded. Three tape test specimens were evaluated and the average failure time obtained. This was reported as shear adhesion strength. Samples that did not fail after 10,000 minutes are listed as 10,000+.

Test Method 3: Low/High Temperature Peel Adhesion

Peel adhesion strength was measured at 150° F., 0° F., −10° F., or −20° F. (66° C., −18° C., −23° C., −29° C., respectively) using an IMASS Slip/Peel Tester (Instrumentors Incorporated, Strongsville, OH). Prior to adhesive application, the tape samples, Exterior Sheathing substrates, and a 2.2-kilogram rubber hand roller were dwelled in a thermally controlled device set to either 150° F., 0° F., −10° F., or −20° F. depending on the test temperature, for 24 hours. After the dwell, a tape test specimen measuring 1 inch (2.54 centimeters) wide was cut from the dwelled sample and applied to the dwelled Exterior Sheathing substrate. The rubber roller was rolled back and forth two times over the length of the adhesive to ensure good contact with the substrate. The prepared panels with the adhered samples were again dwelled at 150° F., 0° F., −10° F., or −20° F. for 24 hours prior to testing. After the dwell, the substrate was immediately attached to the 90° peel test accessory fixed to the moveable platen on the instrument. The peel test was run at a constant rate of 12 inches/minutes (30.48 centimeters/minute) and the average peel force was recorded in ounces/inch. An average of three replicates per sample are reported in the tables below.

Test Method 4: Coefficient of Thermal Expansion

The coefficient of thermal expansion (CTE) of the backing film can be determined with a shrinkage tester device (Perbix Machine Co.) by heating the film at 76.7° C. for tour minutes. Once the test is complete, the percentage length change is read from the instrument and recorded. CTE (α) values are then calculated as follows:

$$\alpha = (\Delta L/L)\Delta T$$

wherein:
α is the coefficient of thermal expansion and reported as ppm/° C.;
ΔL/L is recorded as % length change from the instrument; and
ΔT is the change in temperature.

ΔT for this test is obtained using the difference in the room temperature and the measurement temperature; ΔT=76.7−21.1=55.6° C.

| Table of Materials | |
|---|---|
| Material | Description |
| Acrylic Acid (AA) | Obtained from BASF (Florham Park, NJ, USA). |
| Omnirad BDK (651) | 2,2-Dimethoxy-1,2-diphenylethan-1-one, photoinitiator, obtained from IGM Resins (Charlotte, NC, USA). |

-continued

| Table of Materials | |
|---|---|
| Material | Description |
| XL-353 | 2,4-Bis(trichloromethyl)-6-(4-methoxyphenyl)-triazine, crosslinker (prepared according to Wakabayashi et al., Bull. Chem. Soc. Jap., Vol. 42, pages 2924-2930 (1969), 12th example in Table 4). |
| Foral 85LB (F85LB) | Glycerol ester of highly hydrogenated refined wood rosin, tackifier, obtained from Pinova, Inc. (Brunswick, GA, USA). |
| Arkon P-100 | Hydrocarbon resin, tackifier, obtained from Arakawa Chemical Industries, Ltd (Osaka, Japan). |
| ATBC | Acetyl tributyl citrate, plasticizer, obtained from TCI America (Portland, OR, USA). |
| Black Film | Two-layer construction of EVA and polypropylene, having a total film thickness of 4 mils, preparable as described in U.S. Pat. Pub. No. 2019/0031923 (Khurana et al.). |
| 300LSE Liner | A two-sided silicone release liner on poly-coated kraft paper, obtained from 3M Company (St. Paul, MN, USA). |
| T-50 Release Liner | Obtained from Solutia, Inc. (Kingsport, MO, USA). |
| T-10 Release Liner | Obtained from Solutia, Inc. (Kingsport, MO, USA). |
| Exterior Sheathing (ES) | A structural sheathing panel made of engineered wood with a vapor permeable water-resistive barrier (a resin-impregnated kraft paper overlaid oriented strand board) manufactured by Huber Engineered Woods, obtained from Spring Lake Park Lumber Company (Spring Lake Park, MN, USA). |

| List of Alkyl Acrylate Monomers | |
|---|---|
| Monomer Designation | Monomer Description |
| M 1 | Iso-octyl acrylate (IOA, 3M) |
| M 2 | 2-Propylheptyl acrylate (PHA, BASF) |
| M 3 | Heptadecanyl acrylate (HDA, BASF) |
| M 4 | 2-Butyl-1-octyl acrylate made according to Example GM1 of U.S. Pat. No. 8,137,807 (Clapper et al.) |
| M 5 | C18 acrylate isomer blend made according to Example GM4 of U.S. Pat. No. 8,137,807 (Clapper et al.) |
| M 6 | Octyl acrylate isomer blend prepared as described in U.S. Pat. No. 9,102,774 (Clapper et al.) |
| M 7 | Decyl acrylate isomer blend prepared as described in U.S. Pat. No. 9,102,774 (Clapper et al.) |
| M 8 | Dodecyl acrylate isomer blend prepared as described in U.S. Pat. No. 9,102,774 (Clapper et al.) |
| M 9 | Hexadecyl acrylate isomer blend prepared as described in U.S. Pat. No. 9,102,774 (Clapper et al.) |

Examples 1-7 and Comparative Examples 1-2

Monomers M 1-9 were each mixed using the following example formula: 59.1 g of M 1, 0.90 g of acrylic acid (AA, BASF), and 0.018 g Omnirad BDK (651, IGM Resins). Solutions were well mixed on jar roller and the purged with nitrogen for 45 seconds to remove dissolved oxygen and placed in front of a UV light (365 nm, approximately 5 mW/cm$^2$) until a coatable viscosity was achieved, thereby forming "thickened" samples. A typical target for this step is an approximate viscosity of 3000 cP at room temperature and acrylic conversation of approximately 5-20%.

For "thickened" samples M 2-9, each was then formulated with tackifier Arkon P-100 (Arakawa Chemical Industries, Ltd) at 4.71 pph (parts per hundred relative to the resin), additional Omnirad BDK, and photocrosslinker, XL-353 (2,4-bis(trichloromethyl)-6-(4-methoxyphenyl)-triazine, 3M). As an example formulation, to 60 g of "thickened" monomer formulation based on M 2, 2.826 g of Arkon P-100, 0.042 g XL-353, and 0.126 g Omnirad BDK was added. The mixture was then rotated in the dark until the solid ingredients were completely dissolved, thereby forming adhesive formulations.

For "thickened" sample of M 1, an example formulation was 60 g of "thickened" monomer formulation based on M 1, 2.826 g of Foral 85LB (Pinova, Inc), 0.06 g XL-353, and 0.126 g Omnirad BDK was added. The mixture was then rotated in the dark until the solid ingredients were completely dissolved, thereby forming an adhesive formulation.

The adhesive formulations described above were coated on the polypropylene side of Black Film using a notch bar coater at and approximate thickness of 0.02 mm. The exposed portion of the compositions were irradiated in a nitrogen-inerted environment for four minutes using UVA lamps (OSRAM SYLVANIA F40/350BL BLACKLIGHT, peak wavelength of 352 nanometers, 40 Watts) to provide total UVA energy of 1891 milliJoules/square centimeter. The resulting adhesive tapes were evaluated for peel adhesion strength and shear adhesion strength as described in the test methods. "Carbon Number" means the average molar number of carbons in the side chain of the acrylate ester monomer.

TABLE 1

Peel Performance for Adhesive Films on Exterior Sheathing at −10° F. and 150° F.

| Example | Monomer | Carbon Number | Peel Adhesion to ES at −10° F., oz/in (N/dm) | | Peel Adhesion to ES at 150° F., oz/in (N/dm) | |
|---|---|---|---|---|---|---|
| Comp. 1 | M 1 | 8 | 12.0 (13.1) | FAIL | 58.0 (63.5) | PASS |
| Comp. 2 | M 6 | 8 | 6.9 (7.6) | FAIL | NT | |
| 1 | M 2 | 10 | 32.0 (35.0) | PASS | 14.7 (16.1) | PASS |

TABLE 1-continued

Peel Performance for Adhesive Films on Exterior Sheathing at −10° F. and 150° F.

| Example | Monomer | Carbon Number | Peel Adhesion to ES at −10° F., oz/in (N/dm) | | Peel Adhesion to ES at 150° F., oz/in (N/dm) | |
|---|---|---|---|---|---|---|
| 2 | M 3 | 17 | 32.4 (35.5) | PASS | 30.8 (33.7) | PASS |
| 3 | M 4 | 12 | 42.9 (47.0) | PASS | 38.1 (41.7) | PASS |
| 4 | M 5 | 18 | 37.2 (40.7) | PASS | 33.7 (36.9) | PASS |
| 5 | M 7 | 10 | 24.0 (26.3) | PASS | 33.2 (36.3) | PASS |
| 6 | M 8 | 12 | 30.5 (33.4) | PASS | 47.8 (52.3) | PASS |
| 7 | M 9 | 16 | 0.2 (0.2) | FAIL | 26.0 (28.5) | PASS |

Herein, adhesives that "Pass" the Peel Adhesion Test at −10° F. (−23° C.) (i.e., peel adhesion from a resin-impregnated kraft paper overlaid oriented strand board, after being adhered thereto for 24 hours at −10° F. (−23° C.)) demonstrate a peel adhesion of at least 14 oz/in (15.3 N/dm) at a constant peel rate of 12 in/min (30.48 cm/min).

The data in Table 1 indicates adhesives formulated with acrylic monomers of sufficient side chain length to provide an ability to achieve improved peel adhesion at cold temperatures (−10° F.). Adhesives formulated with monomers with too short of chain length (Comparatives 1 and 2; (meth)acrylic acid ester monomers of Formula (I), RO—C(O)—C($R^3$)=$CH_2$, wherein R has fewer than 10 carbon atoms) have low peel performance at these temperatures. Examples 1-6 show good cold temperature peel adhesion is accessible via acrylate monomers of Formula (I) with carbon chain lengths of 10 to 18 (monomers M 2-5 and 7-8 from Table 1), although Example 7 demonstrates that crystallinity at low temperature can be a problem with long carbon chains, which can be controlled using known processing and formulation techniques.

Herein, adhesives that "Pass" the Peel Adhesion Test at 150° F. (66° C.) (i.e., peel adhesion from a resin-impregnated kraft paper overlaid oriented strand board, after being adhered thereto for 24 hours at 150° F. (66° C.)) demonstrate a peel adhesion of at least 14 oz/in (15.3 N/dm) at a constant peel rate of 12 in/min (30.48 cm/min).

As demonstrated by Comparative 1, cold temperature performance of adhesive tapes is typically more difficult to obtain than hot temperature performance.

Examples 8-17 and Comparative Examples 3-7

Adhesive formulations were prepared according to Table 2 according to the following procedure. M 6 or M 8 were each mixed with acrylic acid (AA, BASF), and 0.09 g Omnirad BDK (651, IGM Resins). The solutions were well mixed on jar roller and the purged with nitrogen for 5 minutes to remove dissolved oxygen and placed in front of a UV light (365 nm, approximately 5 mW/cm²) until a coatable viscosity was achieved. A typical target for this step is an approximate viscosity of 3000 cP at room temperature and acrylic conversion of approximately 10-20%. To the "thickened" sample, Foral 85LB, Arkon P100, Tributyl O-Acetyl Citrate, 0.3 g XL-353, and 0.63 g Omnirad BDK were added. The mixture was then rotated in the dark until the solid ingredients were completely dissolved.

The adhesive formulations described above were coated on the polypropylene side of Black Film using a notch bar coater at and approximate thickness of 0.02 mm. The exposed portion of the compositions were irradiated in a nitrogen-inerted environment for four minutes using UVA lamps (OSRAM SYLVANIA F40/350BL BLACKLIGHT, peak wavelength of 352 nanometers, 40 Watts) to provide total UVA energy of 1891 milliJoules/square centimeter. The resulting adhesive tapes were evaluated for peel adhesion strength and shear adhesion strength as described in the test methods. The results are presented in Table 3.

TABLE 2

| Example | Alkyl Acrylate Monomers (Table 1) | Monomer (grams) | AA (grams) | F85LB (grams) | Arkon P100 (grams) | ATB (grams) |
|---|---|---|---|---|---|---|
| Comp. 3 | M 6 | 294 | 6 | 14.13 | 0 | 0 |
| Comp. 4 | M 6 | 297 | 3 | 0 | 14.13 | 0 |
| Comp. 5 | M 6 | 294 | 6 | 0 | 14.13 | 0 |
| Comp. 6 | M 8 | 295.5 | 4.5 | 0 | 14.13 | 0 |
| Comp. 7 | M 8 | 288 | 12 | 14.13 | 0 | 0 |
| 8 | M 8 | 294 | 6 | 0 | 0 | 0 |
| 9 | M 8 | 292.5 | 7.5 | 0 | 0 | 0 |
| 10 | M 8 | 297 | 3 | 0 | 0 | 0 |
| 11 | M 8 | 295.5 | 4.5 | 0 | 14.13 | 0 |
| 12 | M 8 | 294 | 6 | 0 | 0 | 6 |
| 13 | M 8 | 297 | 3 | 14.13 | 0 | 0 |
| 14 | M 8 | 295.5 | 4.5 | 14.13 | 0 | 0 |
| 15 | M 8 | 294 | 6 | 14.13 | 0 | 0 |
| 16 | M 8 | 292.5 | 7.5 | 14.13 | 0 | 0 |
| 17 | M 8 | 295.5 | 4.5 | 0 | 0 | 0 |

TABLE 3

| Ex. | Peel Adhesion to ES at −20° F., oz/in (N/dm) | Peel Adhesion to ES at −10° F., oz/in (N/dm) | Peel Adhesion to ES at 0° F., oz/in (N/dm) | Peel Adhesion to ES at 74° F., oz/in (N/dm) | Shear Adhesion to SS at 158° F. (min) |
|---|---|---|---|---|---|
| Comp. 3 | NT | 8.56 (9.4) FAIL | 15.5 (16.9) PASS | 53.3 (58.3) PASS | NT |
| Comp. 4 | 3.1 (3.4) FAIL | NT | 13.7 (15.0) FAIL | 45.5 (49.8) PASS | 40 FAIL |
| Comp. 5 | 1.2 (1.3) FAIL | NT | 12.0 (13.1) FAIL | 45.7 (50.0) PASS | 70 FAIL |
| Comp. 6 | 13.7 (15.0) FAIL | NT | 35.2 (38.5) PASS | 32.2 (35.2) PASS | 2510 FAIL |
| Comp. 7 | NT | 3.1 (3.4) FAIL | 9.4 (10.3) FAIL | 47.9 (52.4) PASS | NT |
| 8 | NT | 18.8 (20.6) PASS | 29.1 (31.8) PASS | 30.2 (33.1) PASS | 10000+ PASS |
| 9 | NT | 16.5 (18.1) PASS | 23.6 (25.8) PASS | 39.1 (42.8) PASS | 10000+ PASS |
| 10 | 27.0 (29.6) PASS | 31.9 (34.9) PASS | 37.2 (40.7) PASS | 40.7 (44.6) PASS | 6740 PASS |
| 11 | 19.9 (21.8) PASS | 31.2 (34.2) PASS | 28.9 (31.6) PASS | 34.1 (37.3) PASS | 10000+ PASS |
| 12 | NT | 32.0 (35.0) PASS | 38.1 (41.7) PASS | 37.0 (40.5) PASS | 10000+ PASS |

TABLE 3-continued

| Ex. | Peel Adhesion to ES at −20° F., oz/in (N/dm) | Peel Adhesion to ES at −10° F., oz/in (N/dm) | Peel Adhesion to ES at 0° F., oz/in (N/dm) | Peel Adhesion to ES at 74° F., oz/in (N/dm) | Shear Adhesion to SS at 158° F. (min) |
|---|---|---|---|---|---|
| 13 | NT | 45.1 (49.4) PASS | 38.1 (41.7) PASS | 36.2 (39.7) PASS | 10000+ PASS |
| 14 | 25.1 (27.5) PASS | 33.9 (37.1) PASS | 47.4 (51.9) PASS | 53.9 (59.0) PASS | 236 PASS |
| 15 | NT | 28.9 (31.6) PASS | 44.1 (48.2) PASS | 34.8 (38.1) PASS | 10000+ PASS |
| 16 | NT | 25.3 (27.7) PASS | 31.4 (34.4) PASS | 40.0 (43.8) PASS | 10000+ PASS |
| 17 | NT | 25.5 (27.9) PASS | 28.5 (31.2) PASS | 26.9 (29.4) PASS | 10000+ PASS |

Herein, adhesives that "Pass" the Low/High Temperature Peel Adhesion Test at −20° F. (−29° C.), −10° F. (−23° C.), 0° F. (−18° C.), 74° F. (23° C.), or 150° F. (66° C.) (i.e., a peel adhesion from a resin-impregnated kraft paper overlaid oriented strand board, after being adhered thereto for 24 hours at the respective temperature) demonstrate a peel adhesion of at least 14 oz/in (15.3 N/dm) at a constant peel rate of 12 in/min (30.48 cm/min). For example, Comparative Examples 3-6 demonstrates that octyl acrylate based adhesives do not provide passable cold temperature performance at temperatures 0° C. and below. Examples 8-17 indicate there is an appropriate acrylic acid range to achieve the cold temperature performance with dodecyl acrylate.

Herein, adhesives that "Pass" the High Temperature Shear Test demonstrate a shear adhesion from stainless steel at 158° F. (70° C.) of at least 100 minutes.

Whereas all examples and comparatives have passable peel adhesion at room temperature, the Low Temperature Peel Adhesion and High Temperature Shear Tests demonstrate the difficulties with obtaining good performance at low temperatures, and at both low and high temperatures.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An adhesive tape comprising an acrylic pressure sensitive adhesive layer disposed on a multilayer backing, wherein:
the acrylic pressure sensitive adhesive layer comprises a polymer comprising interpolymerized monomers comprising:
80 to 99.9 parts by weight of one or more (meth)acrylic acid ester monomers of Formula (I):

RO—C(O)—C(R³)=CH₂ wherein:
R is a branched alkyl having 10 to 18 carbon atoms; and
R³ is H or CH₃;
0.1 to 20 parts by weight of one or more acid-functional, ethylenically unsaturated monomers; and 0 to 10 parts by weight of one or more non-acid functional, ethylenically unsaturated polar monomers; and
the multilayer backing comprises:
a core layer, having a first major surface opposite a second major surface, and having a core layer thickness of 10.0 to 4,500 microns; and
a skin layer having a different composition from the core layer, having a skin layer thickness of 3.0 to 1,500 microns but not more than 50% of the core layer thickness, bonded directly to the first major surface of the core layer;
wherein the acrylic pressure sensitive adhesive layer is disposed on the second major surface of the core layer, and wherein the adhesive tape has a peel adhesion from a resin-impregnated kraft paper overlaid oriented strand board, after being adhered thereto for 24 hours at −10° F. (−23° C.), of at least 14 oz/in (15.3 N/dm) at a constant peel rate of 12 in/min (30.48 cm/min).

2. The adhesive tape of claim 1, wherein the one or more (meth)acrylic acid ester monomers of Formula (I) comprise a secondary alkyl (meth)acrylate of Formula (II):

wherein:
R¹ and R² are each independently a C₁ to C₁₆ saturated linear alkyl group;
the sum of the number of carbons in R¹ and R² is 9 to 17; and
R³ is H or CH₃.

3. The adhesive tape of claim 1, wherein the one or more (meth)acrylic acid ester monomers of Formula (I) comprise a (meth)acrylic acid ester of a 2-alkyl alkanol having a molar carbon number average of 10 to 18.

4. The adhesive tape of claim 1, wherein the one or more (meth)acrylic acid ester monomers of Formula (I) comprise an alkyl (meth)acrylate ester of a primary alcohol R—OH; wherein:
the alkyl (meth)acrylate ester is the (meth)acrylic acid ester monomer represented by Formula (V):

RO—C(O)—C(R³)=CH₂ wherein:
R is a branched alkyl having 14 to 18 carbon atoms; and
R³ is H or CH₃; and
the primary alcohol R—OH has an iso number equal to at least 2 but no greater than 4.

5. The adhesive tape of claim 1, wherein the one or more acid-functional, ethylenically unsaturated monomers are selected from an ethylenically unsaturated carboxylic acid, an ethylenically unsaturated sulfonic acid, an ethylenically unsaturated phosphonic acid, and mixtures thereof.

6. The adhesive tape of claim 1, wherein the interpolymerized monomers further comprise a crosslinker in an amount of 0.05 to 0.1 part by weight, based on 100 parts total interpolymerized monomers.

7. The adhesive tape of claim 1, wherein the backing has a coefficient of thermal expansion of less than 90 ppm/° C. as measured in at least one direction within the plane of the backing.

8. The adhesive tape of claim 1, wherein the skin layer is a first skin layer and the multilayer backing further comprises a second skin layer positioned between the second major surface of the core layer and the acrylic pressure sensitive adhesive layer; wherein the second skin layer has a different composition than the core layer and has a second skin layer thickness of 3.0 microns to 1,500 microns but not more than 50% of the core layer thickness.

9. The adhesive tape of claim 1, having an acrylic pressure sensitive adhesive layer thickness of 203 microns±13 microns and a multilayer backing thickness of 102 microns±13 microns.

10. The adhesive tape of claim 1, which is a seam sealing tape.

11. The adhesive tape of claim 1, having at least one of a peel adhesion from a resin-impregnated kraft paper overlaid oriented strand board, after being adhered thereto for 24 hours at 150° F. (66° C.), of at least 14 oz/in (15.3 N/dm) at a constant peel rate of 12 in/min (30.48 cm/min) or a shear adhesion from stainless steel at 158° F. (70° C.) of at least 100 minutes.

12. The adhesive tape of claim 1, wherein the acrylic pressure sensitive adhesive layer further comprises a tackifier.

13. The adhesive tape of claim 1, wherein the core layer comprises at least 50 weight percent of a polyolefin.

14. The adhesive tape of claim 1, wherein the skin layer comprises at least 50 weight percent of a thermoplastic elastomer.

15. The adhesive tape of claim 1, wherein the acrylic pressure sensitive adhesive layer is disposed on only one side of the multilayer backing.

16. A method of applying the adhesive tape of claim 1 to an exterior surface of a building, the method comprising:
    positioning the acrylic pressure sensitive adhesive layer of the adhesive tape on the exterior surface of at least one wood-based panel on the exterior of a building; and
    applying manual pressure to the multilayer backing of the adhesive tape.

17. The method of claim 16, wherein the exterior surface of the building is in a cold environment and the at least one wood-based panel has an average surface temperature of less than −18° C.

18. The method of claim 16, wherein the exterior surface of the building is in a hot environment and the at least one wood-based panel has an average surface temperature of at least 50° C.

19. The method of claim 17, wherein the adhesive tape is a seam sealing tape, wherein positioning the acrylic pressure sensitive adhesive layer of the adhesive tape on the exterior surface of at least one wood-based panel on the exterior of a building comprises positioning the acrylic pressure sensitive adhesive layer of the seam sealing tape on the exterior surface of a butt-joint formed by two wood-based panels on the exterior of a building, wherein the exterior surfaces of the two wood-based panels have an average surface temperature of less than −18° C.

20. The method of claim 18, wherein the adhesive tape is a seam sealing tape, wherein positioning the acrylic pressure sensitive adhesive layer of the adhesive tape on the exterior surface of at least one wood-based panel on the exterior of a building comprises positioning the acrylic pressure sensitive adhesive layer of the seam sealing tape on the exterior surface of a butt-joint formed by two wood-based panels on the exterior of a building, wherein the exterior surfaces of the two wood-based panels have an average surface temperature of at least 50° C.

* * * * *